United States Patent
Ono

[11] Patent Number: 5,270,996
[45] Date of Patent: Dec. 14, 1993

[54] OPTICAL HEAD WITH DIFFRACTION GRATING PRODUCING FIVE DIFFRACTED DETECTION LIGHT BEAMS

[75] Inventor: Yuzo Ono, Tokyo, Japan

[73] Assignee: NEC Corporation, Tokyo, Japan

[21] Appl. No.: 968,477

[22] Filed: Oct. 29, 1992

Related U.S. Application Data

[63] Continuation of Ser. No. 532,150, Jun. 1, 1990, abandoned, which is a continuation of Ser. No. 138,483, Dec. 28, 1987, abandoned.

[30] Foreign Application Priority Data

Dec. 25, 1986 [JP] Japan ............... 61-310887
Mar. 16, 1987 [JP] Japan ............... 62-61725
Jun. 12, 1987 [JP] Japan ............... 62-147681

[51] Int. Cl.$^5$ ............................. G11B 7/135
[52] U.S. Cl. ............... 369/110; 369/44.23; 369/44.42; 369/112; 369/120
[58] Field of Search ........... 369/109, 110, 112, 120, 369/44.23, 44.41, 44.42

[56] References Cited

U.S. PATENT DOCUMENTS

| | | | |
|---|---|---|---|
| 4,504,938 | 3/1985 | Tajima | 369/109 |
| 4,507,772 | 3/1985 | Yamamoto | 369/109 |
| 4,513,408 | 4/1985 | Nomura et al. | 369/44.42 |
| 4,525,825 | 6/1985 | Ito et al. | 369/109 |
| 4,665,310 | 5/1987 | Heemskerk | 250/201 DF |
| 4,720,825 | 1/1988 | Kokado | 369/109 |
| 4,730,295 | 3/1988 | Bressers | 369/109 |
| 4,733,065 | 3/1988 | Hoshi et al. | 369/45 |
| 4,768,183 | 8/1988 | Ohnishi et al. | 369/120 |
| 4,771,411 | 9/1988 | Greve | 369/109 |
| 4,783,589 | 11/1988 | Ando | 369/44.42 X |
| 4,817,074 | 3/1989 | Yamanaka | 369/44.42 X |
| 4,885,734 | 12/1989 | Yuzo | 369/109 X |
| 4,945,529 | 7/1990 | Ono et al. | 369/44.42 X |

OTHER PUBLICATIONS

Y. Togami, "Magneto-Optic Disk Storage", IEEE Trans. on Magnetics, vol. MAG-18, No. 6, Nov. 1982, pp. 1233-1237.

Y. Nagao et al, "Dynamic Recording and Readout ... Exerciser", Japanese Journal of Applied Physics, vol. 21, No. 8, Aug. 1982, pp. L509-L511.

Bulthuis et al, "Ten billion bits on a disk", IEEE Spectrum, Aug. 1979, pp. 26-33.

J. Heemskerk, "Noise in a video disk system ... laser", Applied Optics, vol. 17, No. 13, Jul. 1, 1978, pp. 2007-2012.

Primary Examiner—W. R. Young
Attorney, Agent, or Firm—Sughrue, Mion, Zinn, Macpeak & Seas

[57] ABSTRACT

An optical head comprises a grating lens for diffracting light beam separated from the light beam path. The grating lens is composed of a plurality of regions having different focal length and diffraction direction so that the light beam is divided into a predetermined number of light beams. Therefore, a conventional beam splitter or polarizing beam splitter is replaced by a grating lens so that the optical head can be smaller and lighter, and the precision of detecting a track and focus errors is improved.

4 Claims, 7 Drawing Sheets

FIG. 12

OPTICAL HEAD WITH DIFFRACTION GRATING PRODUCING FIVE DIFFRACTED DETECTION LIGHT BEAMS

This is a continuation of application Ser. No. 07/532,150 filed Jun. 1, 1990, which was a continuation of application Ser. No. 07/138,483 filed on Dec. 28, 1987, both now abandoned.

FIELD OF THE INVENTION

The invention relates to an optical head, and more particularly to an optical head by which information can be recorded into and read out of such an optical disk as a DRAW (Direct Read After Write) optical disk, E-DRAW (Erasable Direct Read After Write) optical disk, video disk, digital audio disk, and so on.

BACKGROUND OF THE INVENTION

One conventional optical head comprises a semiconductor laser from which a laser beam radiates, a collimating lens for collimating the laser beam, a polarizing beam splitter for passing the laser beam from the semiconductor laser and for reflecting the laser beam which is reflected from an optical disk, a ¼ wavelength plate for converting the laser beam which is passed through the polarizing beam splitter into a circularly polarized laser beam and for converting the laser beam which is reflected from the optical disk into a linearly polarized laser beam having a polarized plane orthogonal to a polarization of the laser beam path, a total reflecting prism for reflecting the laser beam which is passed through the ¼ wavelength plate and which is reflected from the optical disk, an object lens for focusing the laser beam from the semiconductor laser on the optical disk and for collimating the laser beam which is reflected from the optical disk, a focusing lens for focusing the laser beam which is reflected by the polarizing beam splitter, a beam splitter for dividing the laser beam which is focussed by the focusing lens into passing and reflecting beams, a first two-divided optical detector for receiving the laser beam which is passed through the beam splitter to provide a tracking error signal and RF signal, a knife-edge for shielding a half of the laser beam which is reflected by the beam splitter, and a second two-divided optical detector for receiving a remaining half of the laser beam which is not shielded by the knife-edge to provide a focus error signal.

In operation, the laser beam which is radiated from the semiconductor laser is collimated by the collimating lens, and then passed through the polarizing beam splitter. The laser beam which is passed through the polarizing beam splitter is converted into the circularly polarized beam, and then reflected by the total reflecting prism. Thereafter, the laser beam is focussed on the optical disk by the object lens, and then reflected therefrom to be reflected again by the total reflecting prism. The laser beam thus reflected is converted into the linearly polarized laser beam having a polarized plane orthogonal to the polarization of the laser beam path by the ¼ wavelength plate, and then reflected by the polarizing beam splitter. Thereafter, the laser beam is focussed by the focusing lens. The laser beam thus focussed is partially passed through the beam splitter to be received by the first two-divided optical detector from which the tracking error signal is obtained in the calculation of the subtraction between signals of two optical detecting elements therein by the push-pull method, and the RF signal is obtained in the calculation of the addition between the signals thereof. On the other hand, a half of the laser beam which is reflected by the beam splitter is not shielded by the knife edge to be received by the second two-divided optical detector from which the focus error signal is obtained in the calculation of the subtraction between signals of two optical detecting elements therein by the Foucault method.

According to the conventional optical head, however, there is a disadvantage that an optical head which is put into a practical use is larger in size than, for instance, 40×40×30 mm³ so that it is bulky and heavy. There is a further disadvantage that light beams supplied to the two optical detecting elements become imbalanced because the light axis of the object lens is deviated in regard to the dividing line of the first two divided optical detector when the object lens is moved in a direction vertical to the light axis by an actuator which is operated in accordance with a tracking error signal. Consequently, there results a still further disadvantage that a direct current offset is induced in the tracking error, signal so that a scope becomes narrower in controlling the tracking error. In addition, there is a yet further disadvantage that a manufacturing cost is high because many parts which are necessary to be polished optically are used therein.

SUMMARY OF THE INVENTION

Accordingly, it is an object of the invention to provide an optical head which is small and lightweight.

It is a further object of the invention to provide an optical head in which a scope of controlling a tracking error is wide.

It is a still further object of the invention to provide an optical head which is manufactured with a low cost.

According to the invention, an optical head comprises, a light source for radiating a light beam, a ¼ wavelength plate for converting said light beam into a circularly polarized light beam and for converting said circularly polarized light beam in the direction opposite to said light beam into a linearly polarized beam, an object lens for focusing said circularly polarized light beam on a recording medium, a polarizing beam splitter for separating a light beam which is reflected from said recording medium to be received through said ¼ wavelength plate, a grating lens having a plurality of regions of different properties in regard to at least one of a focal length and diffraction direction for diffracting a light beam separated by said polarizing beam splitter, and an optical detector having a plurality of light receiving surfaces, wherein light beams diffracted by said grating lens including a zero-order diffraction light beam are detected by said plurality of light receiving surfaces corresponding thereto.

BRIEF DESCRIPTION OF THE DRAWINGS

The invention will be described in more detail in conjunction with the following drawings wherein.

DESCRIPTION OF THE PREFERRED EMBODIMENTS

Before explaining a preferred embodiment according the invention, conventional optical heads will be explained.

Figure 1A:
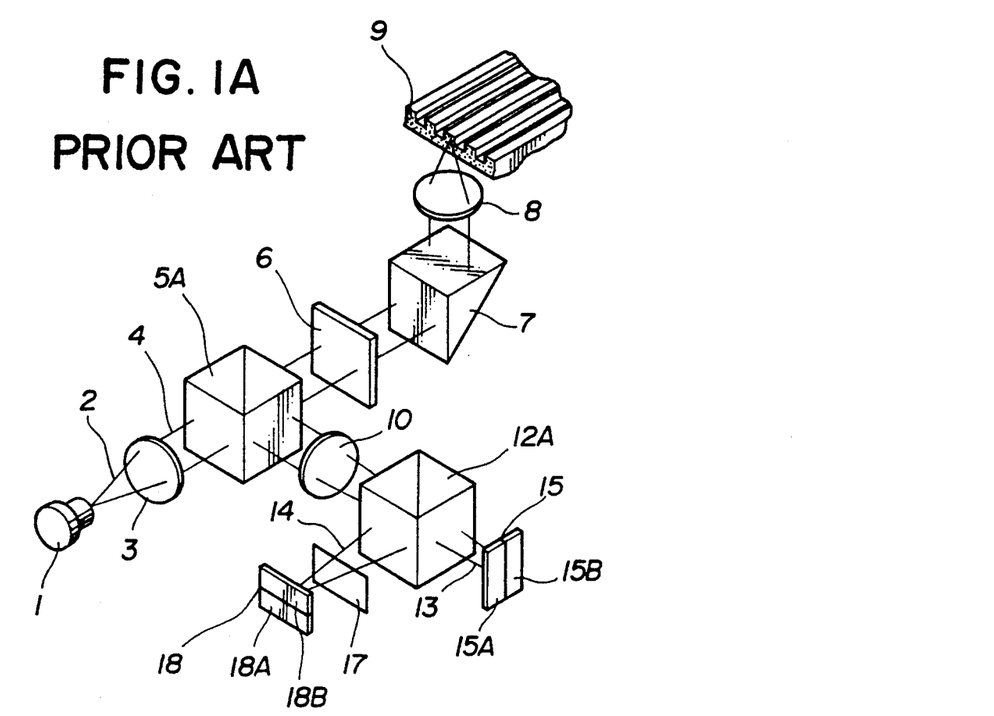
FIGS. 1A to 1C are explanatory views showing conventional optical heads.

In FIG. 1A, there is shown a first conventional optical head which was described briefly before. The conventional optical head comprises a semiconductor laser 1 from which laser beam 2 radiates, a collimating lens 3 for collimating the laser beam 2, a polarizing beam splitter 5A for passing the laser beam 4 from the semiconductor laser 1 and for reflecting the laser beam which is reflected from an optical disk 9, a ¼ wavelength plate 6 for converting the laser beam which is passed through the polarizing beam splitter 5A into circularly polarized laser beam and for converting the laser beam which is reflected from the optical disk 9 into a linearly polarized laser beam having a polarized plane orthogonal to a polarization of the laser beam path, a total reflecting prism 7 for reflecting the laser beam which is passed through the ¼ wavelength plate 6 and which is reflected from the optical disk 9, an object lens 8 for focusing the laser beam from the semiconductor laser 1 on the optical disk 9 and for collimating the laser beam which is reflected from the optical disk 9, a focusing lens 10 for focusing the laser beam which is reflected by the polarizing beam splitter 5A, a beam splitter 12A for dividing the laser beam which is focussed by the focusing lens 10 into passing and reflecting beams 13 and 14, a first two-divided optical detector 15 having optical detecting elements 15A and 15B for receiving the laser beam 13 which is passed through the beam splitter 12A to provide a tracking error signal and RF signal, a knife-edge 17 for shielding a half of the laser beam 14 which is reflected by the beam splitter 12A, and a second two-divided optical detector 18 having optical detecting elements 18A and 18B for receiving a remaining half of the laser beam 14 which is not shielded by the knife edge 17 to provide a focus error signal.

The operation of the first conventional optical head was described before so that repeated explanations are omitted here.

Figure 1B:
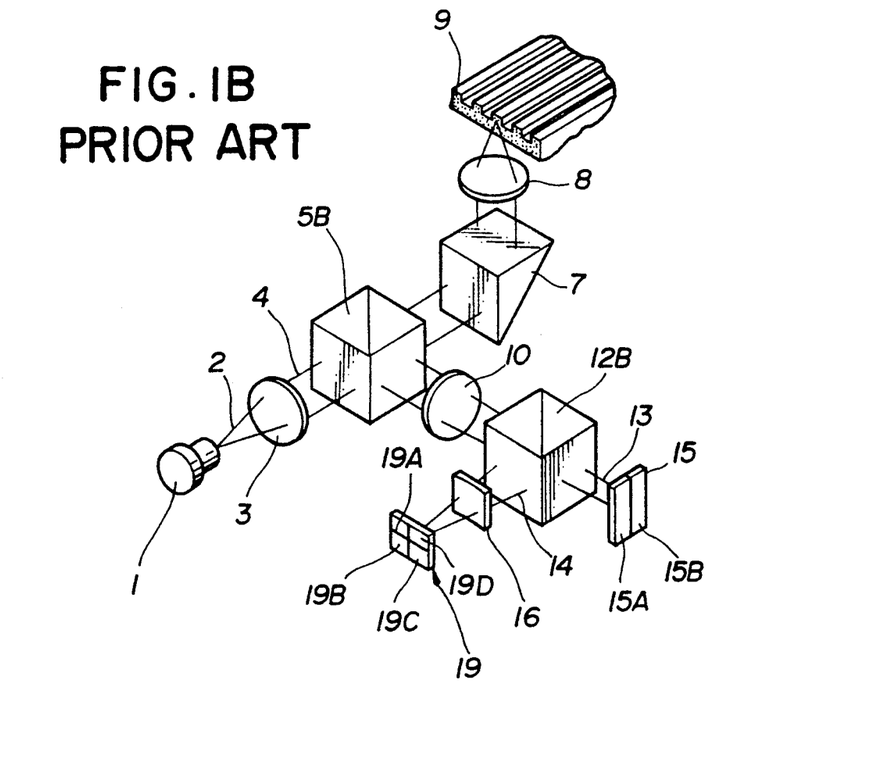

In FIG. 1B, there is shown a second conventional optical head in which like parts are indicated by like reference numerals in FIG. 1A except that the polarizing beam splitter 5A, beam splitter 12A, knife-edge 17 and two-divided optical detector 18 are replaced respectively by a beam splitter 5B, polarizing beam splitter 12B, cylindrical lens 16 and four-divided optical detector 19 having optical detecting elements 9A to 19D , and the ¼ wavelength plate 6 is removed.

In operation, the laser beam supplied from the focusing lens 10 is divided into polarized laser beams 13 and 14 having polarized planes orthogonal to each other by the polarizing beam splitter 12B. The laser beam which is thus passed through the polarizing beam splitter 12B is received in the two-divided optical detector 15 having optical detecting elements 15A and 15B from which a tracking error signal is obtained in the calculation of the subtraction between signals of the optical detecting elements 15A and 15B by the push-pull method. On the other hand, the laser beam 14 which is reflected by the polarizing beam splitter 12B is passed through the cylindrical lens 16 to have an astigmatism wave plane, and then received in the four-divided optical detector 19 from which a focus error signal is obtained in the astigmatism method. In the four-divided optical detector 19, the focus error signal is obtained in the calculation of $V_A + V_B - V_C - V_D$, where $V_A$, $V_B$, $V_C$, and $V_D$ are output voltages of the optical detecting elements 19A to 19D respectively. Further, if it is assumed that output voltages of the optical detecting elements 15A and 15B of the two-divided optical detector 15 are $V'_A$ and $V'_B$, a RF signal is obtained in the calculation of $V'_A + V'_B - V_A - V_B - V_C - V_D$. In the second conventional optical head, the polarized plane of the laser beam from the semiconductor laser 1 is positioned to be inclined by forty-five degrees in regard to a base plane of an optical system because the beam splitter 5B is of a non-polarizing type so that the divided laser beams 13 and 14 of the polarized beam splitter 12B are parallel to the base plane of the optical system.

Figure 1C:
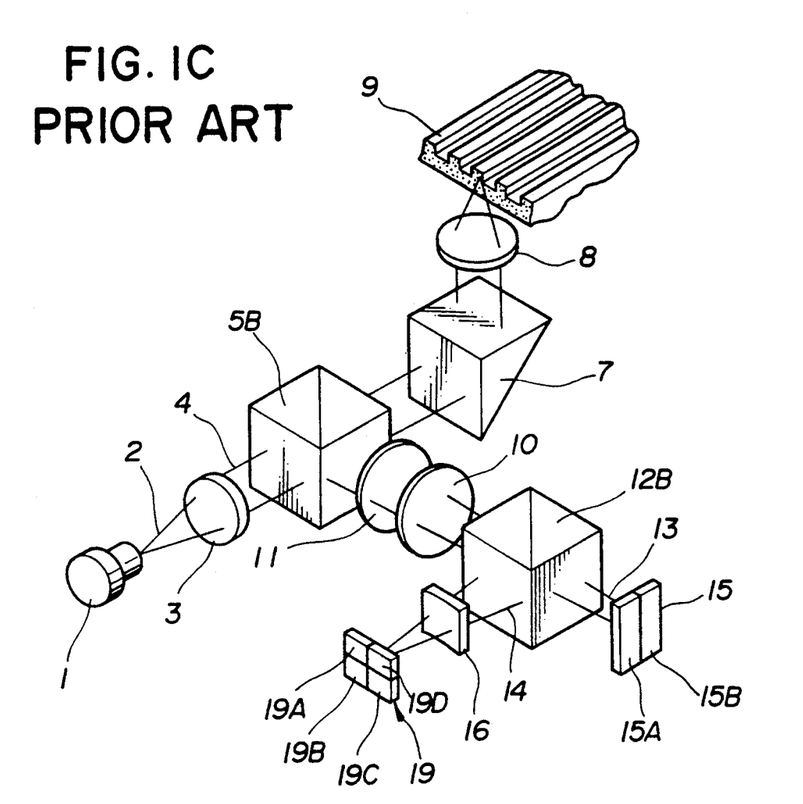

In FIG. 1C, there is shown a third conventional optical head in which like parts are indicated by like reference numerals in FIG. 1B except that a ½ wavelength plate 11 is further provided between the beam splitter 5B and focusing lens 10.

In operation, the laser beam reflected from the optical disk 9 is reflected by the total reflecting prism 7 and then by the beam splitter 5B to be passed through the ½ wavelength plate 11, thereby being rotated in its polarized direction by ninety degrees. The operation of the third conventional optical head is performed in the substantially same manner as in the second conventional optical head as mentioned before except for the operation of the ½ wavelength plate 11.

Next, the preferred embodiments according to the invention will be explained in conjunction with FIGS. 2 to 12.

Figure 2:
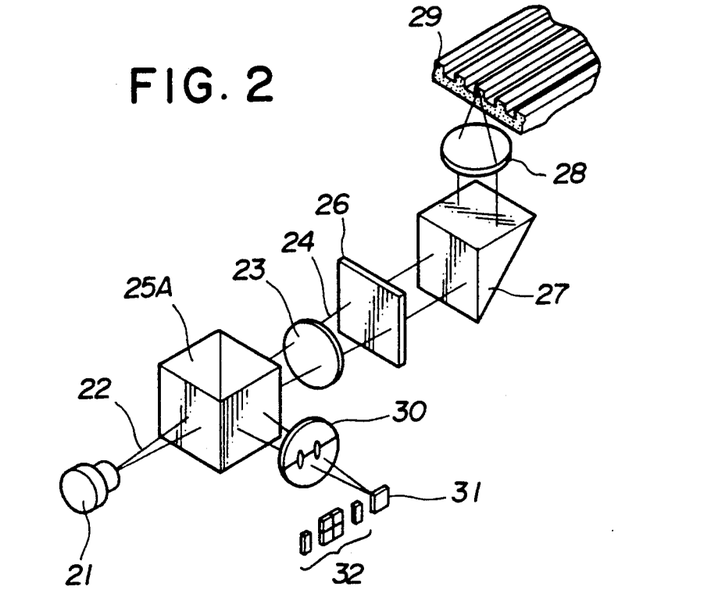
FIGS. 2 and 3 are explanatory views showing an optical head in a first embodiment according to the invention.

In FIG. 2, there is shown an optical head in a first embodiment according to the invention. The optical head comprises a semiconductor laser 21 for radiating laser beam 22, a polarizing beam splitter 25A for passing the laser beam 22 and for reflecting the laser beam in the opposite direction, a collimating lens 23 for collimating the laser beam 22 to produce collimated laser beam 24, a ¼ wavelength plate 26 for converting the collimated laser beam 24 into a circularly polarized laser beam and for converting the laser beam travelling in the opposite direction into a linearly polarized laser beam, a total reflecting prism 27 for reflecting the laser beam, an object lens 28 for focusing the laser beam on an optical disc 29 and for collimating the laser beam which is reflected from the optical disc 29, a grating lens 30 for diffracting the laser beam which is reflected by the polarizing beam splitter 25A, an optical detector 31 for receiving zero-order diffraction light supplied from the grating lens 30, and a six-divided optical detector 32 for receiving first-order diffraction light supplied from the grating lens 30.

Figure 3:
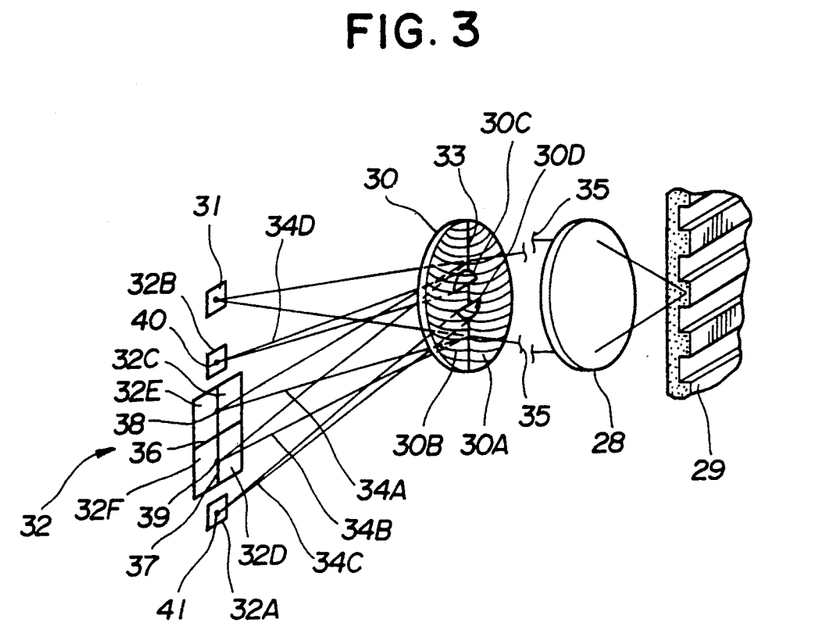

In FIG. 3, there is shown a relation of the grating lens 30, optical detector 31, and six-divided optical detector 32 in the first embodiment. The grating lens 30 is optically connected through abbreviating portions 35 to the object lens 28 and optical disc 29. The grating lens 30 is divided into first and second regions 30A and 30B each having a different focal length and diffraction direction from those of the other by a line 33 intersecting the light axis of the collimating lens 23, and is further provided with third and fourth regions 30C and 30D each having a different focal length and diffraction direction from those of the first and second regions 30A and 30B on the line 33. The six-divided optical detector 32 includes separated optical detecting elements 32A and 32B, and optical detecting elements 32C to 32F divided by lines 36 and 37 orthogonal to each other. The first region 30A of the grating lens 30 has a grating pattern corresponding to interference fringes which are formed with spherical waves radiating respectively from the optical detector 31 and a point 38 on the dividing line 37 of the six-divided optical detector 32. The second region 30B of the grating lens 30 has a grating pattern corresponding to interference fringes which are formed with spherical waves radiating respectively from the optical detector 31 and a point 39 on the dividing line 37 of the six-divided optical detector 32, while the third and fourth regions 30C and 30D of the grating lens 30 have grating patterns respectively corresponding to interference fringes which are formed with spherical waves radiating respectively from the optical detector 31 and a point 40 of the optical detecting element 32B of the six-divided optical detector 32, and with spherical waves radiating respectively from the optical detector 31 and a point 41 of the optical detecting element 32A of the six-divided optical detector 32.

In operation, the laser beam 22 radiating from the semiconductor laser 21 is passed through the polarizing beam splitter 25A, and then collimated by the collimating lens 23. The collimated laser beam 24 is converted in the ¼ wavelength plate into the circularly polarized laser beam which is reflected by the total reflecting prism 27. Thereafter, the laser beam is focussed on the optical disc 29 by the object lens 28, and then reflected therefrom. The reflected laser beam is received through the object lens 28 and total reflecting prism 27 in the ¼ wavelength plate to be converted into the linearly polarized laser beam having a polarized plane orthogonal to the polarization of the laser beam path. Thereafter, the laser beam is focussed by the collimating lens 23 to be reflected by the polarizing beam splitter 25A. The laser beam thus reflected is diffracted in the grating lens 30 so that the first-order diffraction light beams 34A to 34D are received on the points 38 to 41 of the six-divided optical detector 32, while the zero-order diffraction light beam is received in the optical detector 31.

Figures 4A, 4B, 4C:
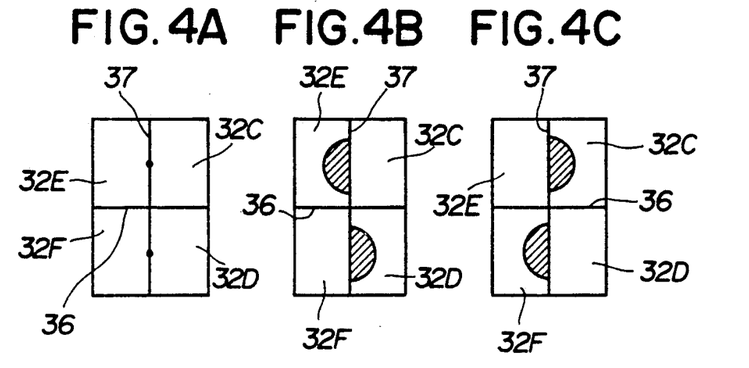
FIGS. 4A to 4C are explanatory diagrams showing an optical detector for detecting a focusing error.

In FIG. 4A, the diffraction light beams 34A and 34B from the first and second regions 30A and 30B of the grating lens 30 are focussed on the line 37 at the symmetrical upper and lower points in regard to the line 36 in a case where the laser beam is exactly focussed on the optical disc 29 by the object lens 28.

In FIG. 4B, there are shown diffraction light beams 34A and 34B which are supplied to the six-divided optical detector 32 in a case where a distance between the surface of the optical disk 29 on which the laser beam is focussed and the object lens 28 is longer due to the moving of the optical disk 29. The diffraction light beams 34A and 34B are not supplied to the optical elements 32C and 32F, but to the optical elements 32D and 32E.

In FIG. 4C, there are shown diffraction light beams 34A and 34B which are supplied to the six-divided optical detector 32 in a case where the surface of the optical disk 29 becomes nearer the object lens 28 than a focal length so that the diffraction lights 34A and 34B are not supplied to the optical detecting elements 32D and 32E, but to the optical detecting elements 32C and 32F.

Accordingly, if it is assumed that outputs of the optical detecting elements 32C to 32F are $V_{32C}$, $V_{32D}$, $V_{32E}$, and $V_{32F}$, a focus error signal is obtained in the equation of $V_{32C}+V_{32F}-V_{32D}-V_{32E}$.

On the other hand, a tracking error signal is obtained by detecting the imbalance of intensity distribution of light which is reflected from the optical disk 29 when a spot which is focussed on the optical disk 29 deviates off the center of a track thereof. For this purpose, the grating lens 30 is arranged such that the light axis of the object lens 28 intersects a line connecting the centers of the third and fourth regions 30C and 30D in the center thereof, and the line is parallel to the direction of a track error.

If a tracking error is induced on the optical disk 29, the lights which are supplied to the third and fourth regions 30C and 30D differ in amount from each other. Therefore, the difference of the light amounts is calculated to detect the tracking error in accordance with outputs of the optical detecting elements 32A and 32B. The direction of the tracking error is decided dependent on the positive or negative of a tracking error signal. In addition, a signal which is reproduced from the optical disk 29 is obtained in accordance with an output of the optical detector 31.

Here, a possible problem will be discussed in which a diffraction angle is changed at the grating lens 30 dependent on the fluctuation of a wavelength in the semiconductor laser 21, thereby resulting in the deviation of positions on the optical detectors 31 and 32 to which diffraction lights are supplied. In regard to the position deviation parallel to the dividing line 37, at first, it is not considered to be "a problem", unless such a deviation as crossing over the dividing line 36 or missing the optical detector occurs. In regard to the deviation orthogonal to the dividing line 37, next, a caution should be taken because outputs of the optical detecting elements 32C to 32F for the optical detector 32 are changed. In the invention, however, the first and second regions 30A and 30B of the grating lens 30 do not have spatial frequency in this direction so that the position deviation of diffraction light beams is negligible in this direction. In regard to the detection of a tracking error, the optical detecting elements 32A and 32B are positioned to receive diffraction light beams in the center thereof so that no problem occurs even if a wavelength is changed in the semiconductor laser 21.

In the first embodiment according to the invention, further, the grating lens 30 is structured to have the third and fourth regions 30C and 30D each having the same area which is symmetrically positioned in regard to the light axis. As a result, a direct current offset as mentioned before does not occur in detecting a tracking error because the light amounts which are received in the third and fourth regions 30C and 30D are unchanged even if the light axis of the object lens 28 is moved in the vertical direction in regard to a track of the optical disk 29.

Figure 5:
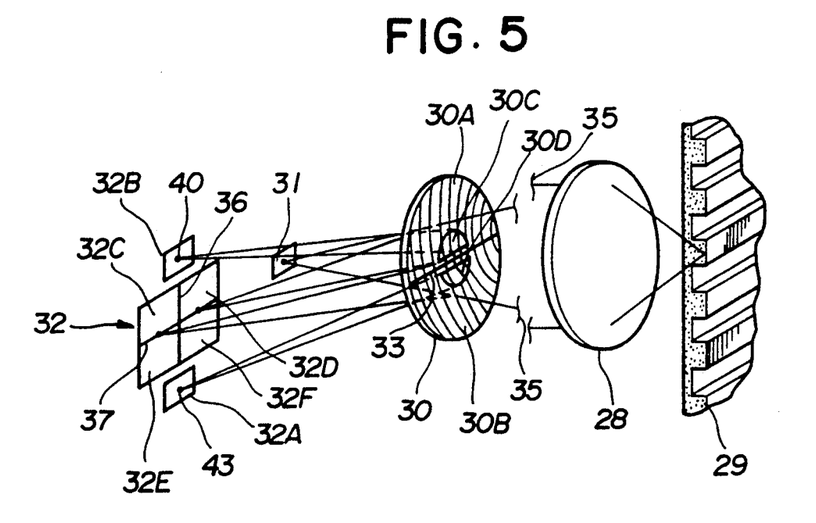
FIG. 5 is an explanatory view showing a grating lens for an optical head in a second embodiment according to the invention.

In FIG. 5, there is shown an optical head in the second embodiment according to the invention. The optical head is the same as in the first embodiment except that the dividing line 37 of the six-divided optical detector 32 is parallel to a track direction of the optical disk 29 so that the third and fourth regions 30C and 30D of the grating lens 30 are positioned on the both sides of the dividing line 33 thereof, and except that the optical detecting elements 32A and 32B for detecting a tracking error are positioned on an extended line of the dividing line 36.

As a matter of course, the six-divided optical detector 32 may be rotated around the light axis of the grating lens 30 together with the dividing line 33 thereof by a predetermined angle in the first and second embodiments. Further, the optical detecting elements 32A and 32B may be changed in their position if both elements 32A and 32B can receive diffraction light beams separately from the third and fourth regions 30C and 30D of the grating lens 30.

Figure 6:
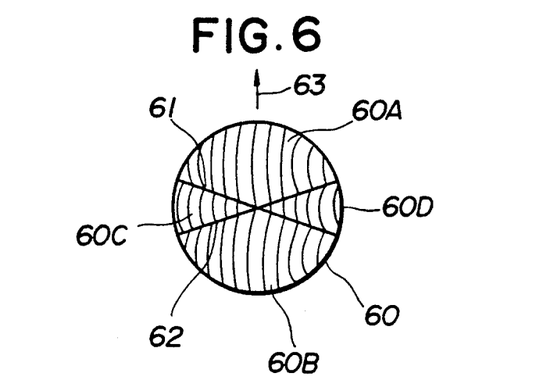
FIG. 6 is an explanatory view showing a grating lens for an optical head in a third embodiment according to the invention.

In FIG. 6, there is shown a grating lens 60 which is applied to an optical head in the third embodiment according to the invention. The grating lens 60 is provided with first to fourth regions 60A to 60D divided by lines 61 and 62. The first to fourth regions 60A to 60D correspond to the first to fourth regions 30A and 30D of the grating lens 30 in the first and second embodiments so that the same operation as in the first embodiment is performed when the grating lens 60 is arranged to be aligned with a tracking direction of an optical disk as shown by an arrow 63.

Figure 7:
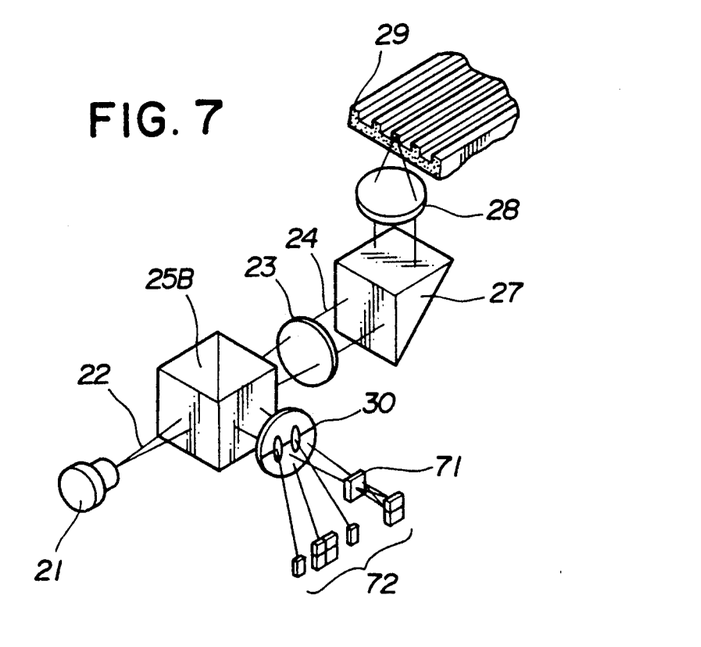
FIGS. 7 and 8 are explanatory views showing an optical head in a fourth embodiment according to the invention.

In FIG. 7, there is shown an optical head in the fourth embodiment according to the invention. The optical head comprises a semiconductor laser 21 from which laser beam 22 radiates, a beam splitter 25B for passing the laser beam 22 and for reflecting the laser beam in the opposite direction thereto, a collimating lens 23 for collimating the laser beam which is passed through the beam splitter 25B and for focusing the laser beam in the opposite direction thereto, a total reflecting prism 27 for reflecting a collimated laser beam 24 and a laser beam in the opposite direction thereto, an object lens 28 for focusing a laser beam which is reflected by the total reflecting prism 27 on an optical disk 29 and for collimating a laser beam which is reflected from the optical disk 29, a grating lens 30 for diffracting the laser beam which is reflected by the beam splitter 25B, a polarizing prism 71 for dividing zero-order diffraction light supplied from the grating lens 30 into two polarized laser beams each having a polarized plane orthogonal to the other, and an eight-divided optical detector 72 having a first group of six optical detecting elements for receiving diffraction laser beams and a second group of two optical detecting elements for receiving the zero-order diffraction light.

Figure 8:
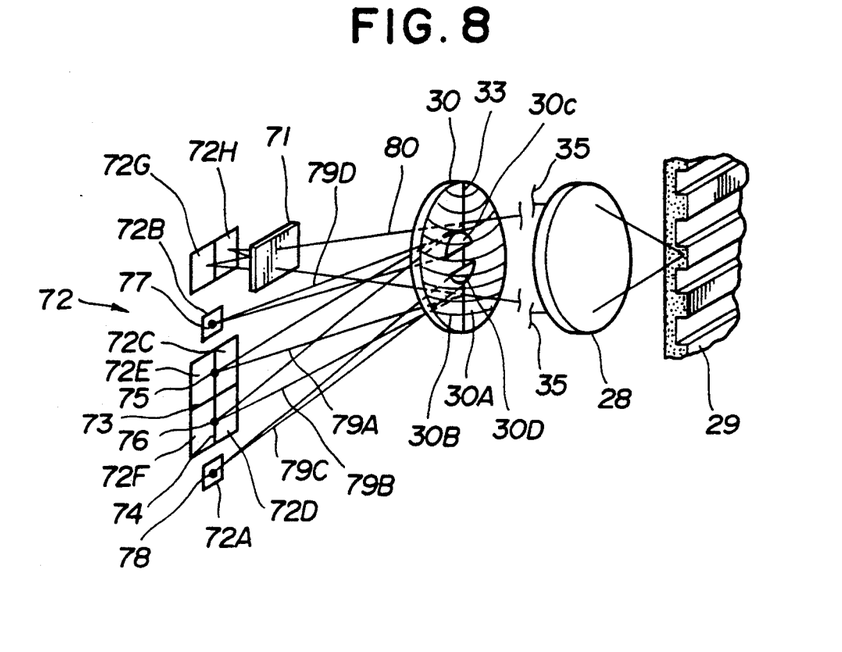

In FIG. 8, there is shown a relation of the grating lens 30, polarizing prism 71, and eight-divided optical detector 72 in the fourth embodiment. The grating lens 30 is optically connected through abbreviating portions 35 to the object lens 28 and optical disc 29. The grating lens 30 is divided into first and second regions 30A and 30B each having a different focal length and diffraction direction from those of the other by line 33 intersecting the light axis of the collimating lens 23, and is further provided with third and fourth regions 30C and 30D each having a different focal length and diffraction direction from those of the first and second regions 30A and 30B on the line 33. The eight-divided optical detector 72 includes the first group consisting of separated optical detecting elements 72A and 72B, and optical detecting elements 72C to 72F divided by lines 73 and 74 orthogonal to each other, and the second group consisting of optical detecting elements 72G and 72H. The first region 30A of the grating lens 30 has a grating pattern corresponding to interference fringes which are formed with spherical waves radiating respectively from a convergence point of the zero-order diffraction light 80 and a point 75 on the dividing line 74 of the eight-divided optical detector 72. The second region 30B of the grating lens 30 has a grating pattern corresponding to interference fringes which are formed with spherical waves radiating respectively from the convergence point of the zero-order diffraction light 80 and a point 76 on the dividing line 74 of the eight-divided optical detector 32, while the third and fourth regions 30C and 30D of the grating lens 30 have grating patterns respectively corresponding to interference fringes which are formed with spherical waves radiating respectively from the convergence point of the zero-order diffraction light 80 and a point 77 of the optical detecting element 72B of the eight-divided optical detector 72, and with spherical waves radiating respectively from the convergence point of the zero order diffracting light 80 and a point 78 of the optical detecting element 72A of the eight-divided optical detector 72.

In operation, a laser beam which is supplied through the object lens 28 to the grating lens 30 after being reflected on the optical disk 29 is diffracted to be received on the points 75, 76, 77, and 78 of the eight-divided optical detector 72 as diffraction light beams 79A, 79B, 79C and 79D. On the other hand, the zero-order diffraction light 80 which is not diffracted is divided into two polarized light beams each having a polarized plane orthogonal to the other by the polarizing prism 71. The two polarized light beams are received on the optical detecting elements 72G and 72H of the eight-divided optical detector 72 respectively. A RF signal is obtained in the calculation of the subtraction between outputs of the two optical detecting elements 72G and 72H.

Figure 9A:
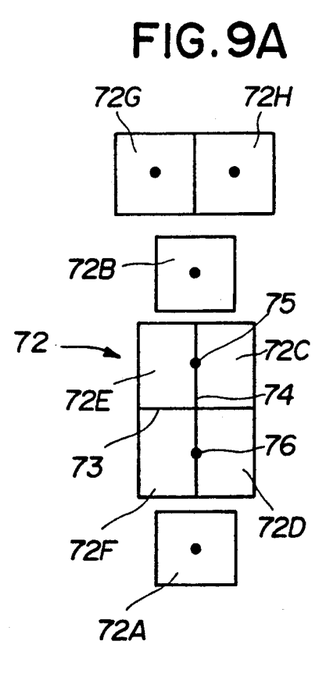
FIGS. 9A to 9C are explanatory diagrams showing an optical detector for the optical head in the fourth embodiment according to the invention.

In FIG. 9A, the diffraction light beams 79A and 79B from the first and second regions 30A and 30B of the grating lens 30 are focussed on the line 74 of the eight-divided optical detector 72 at the symmetrical upper and lower points 75 and 74 in regard to the line 73 in a case where the laser beam is exactly focussed on the optical disk 29 by the object lens 28.

Figure 9B:
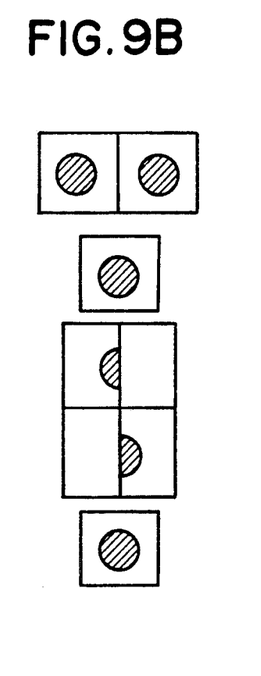

In FIG. 9B, there are shown diffraction light beams 79A and 79B which are supplied to the eight-divided optical detector 72 in a case where a distance between the surface of the optical disk 29 on which the laser beam is focussed and the object lens 28 is longer due to the moving of the optical disc 29. The diffraction light beams 79A and 79B are not supplied to the optical detecting elements 72C and 72F, but to the optical detecting elements 72D and 72E.

Figure 9C:
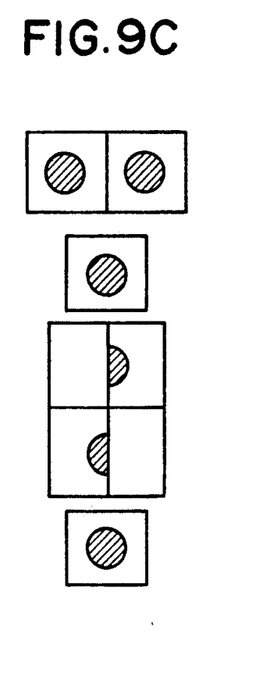

In FIG. 9C, there are shown diffraction light beams 79A and 79B which are supplied to the eight-divided optical detector 72 in a case where the surface of the optical disc 29 becomes nearer the object lens 28 than a focal length so that the diffraction light beams 79A and 79B are not supplied to the optical detecting elements 72D and 72E, but to the optical detecting elements 72C and 72F.

Accordingly, if it is assumed that outputs of the optical detecting elements 72C to 72F are $V_{72C}$, $V_{72D}$, $V_{72E}$, and $V_{72F}$, a focus error signal is obtained in the equation of $V_{72C} + V_{72F} - V_{72D} - V_{72E}$.

On the other hand, a tracking error signal is obtained in the same manner as in the first embodiment. Further, the optical head in the fourth embodiment may be modified by use of the grating lens 30 or 60 in FIG. 5 or 6 as explained before.

Figure 10:
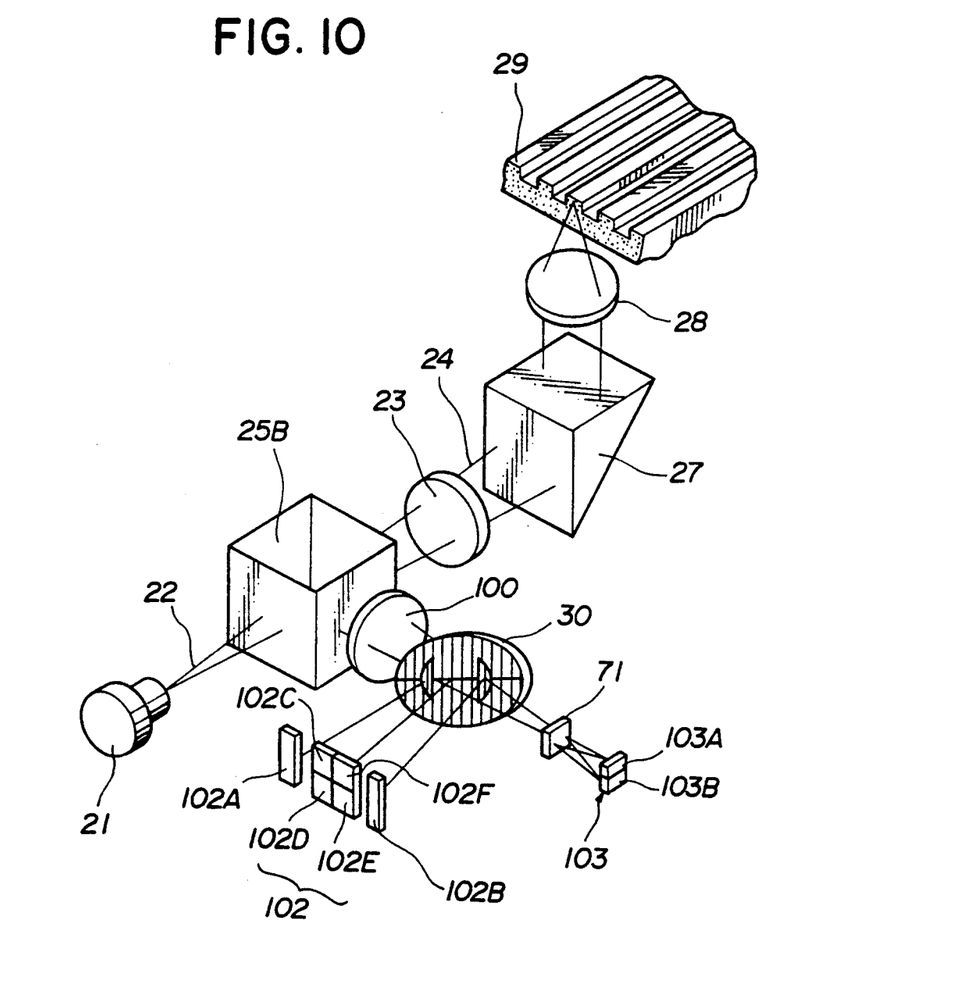
FIGS. 10 and 11 are explanatory views showing an optical head in a fifth embodiment according to the invention.

In FIG. 10, there is shown an optical head in the fifth embodiment according to the invention in which like parts are indicated by like reference numerals in FIG. 7, provided that the optical head is different from one in FIG. 7 in that a ½ wavelength plate 100 for rotating the laser beam which is reflected by the beam splitter 25B in its polarization by ninety degrees is further provided between the beam splitter 25B and grating lens 30, the eight-divided optical detector 72 is replaced by a six-divided optical detector 102 and two-divided optical detector 103, and a grating lens 30 having a specified ratio $\lambda/d$ of 1.6 is utilized in a case where a grating of a sinusoidal cross section having a ratio $h/d$ of 0.5 is utilized, where $\lambda$ is a wavelength, d is a pitch of gratings, and h is a depth of a grating groove.

Figure 11:
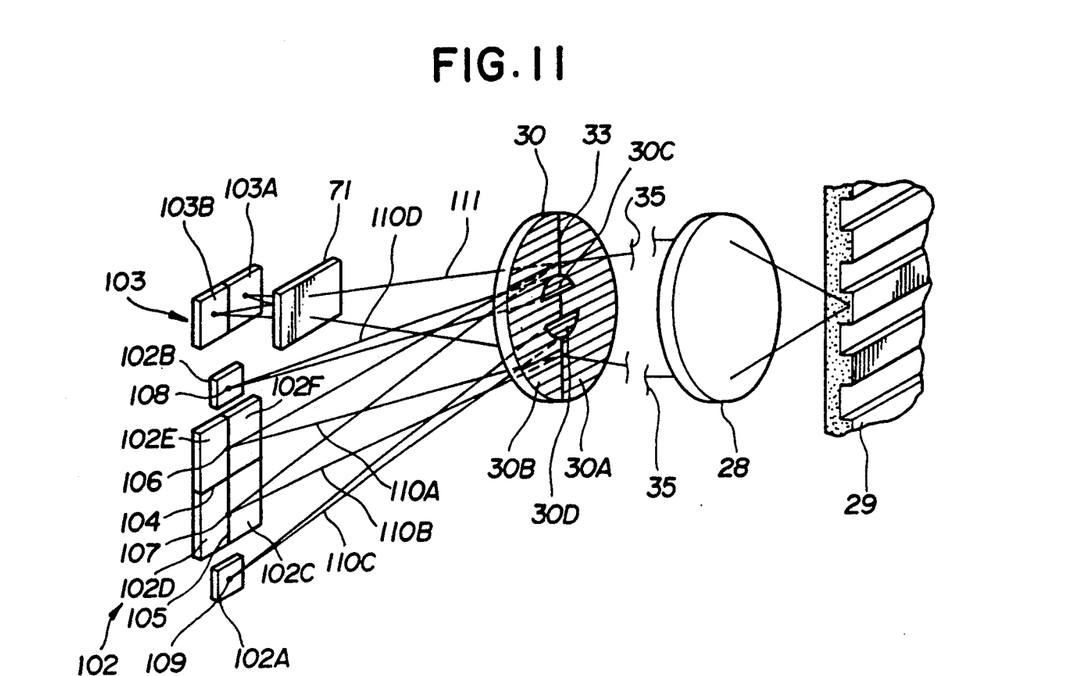

In FIG. 11, there is shown a relation of the grating lens 30, optical detector 103, and six-divided optical detector 102 in the fifth embodiment. The grating lens 30 is optically connected through abbreviating portions 35 to the object lens 28 and optical disk 29. The grating lens 30 is divided into first and second regions 30A and 30B each having a different focal length and diffraction direction from those of the other by a line 33 intersecting the light axis of the collimating lens 23, and is further provided with third and fourth regions 30C and 30D each having a different focal length and diffraction direction from those of the first and second regions 30A and 30B on the line 33. The six-divided optical detector 102 includes separated optical detecting elements 102A and 102B, and optical detecting elements 32C to 32F divided by lines 104 and 105 orthogonal to each other. The first region 30A of the grating lens 30 has a grating pattern corresponding to interference fringes which are formed with spherical waves radiating respectively from a convergence point of the zero-order diffraction light 111 and a point 106 on the dividing line 105 of the six-divided optical detector 102. The second region 30B of the grating lens 30 has a grating pattern corresponding to interference fringes which are formed with spherical waves radiating respectively from the convergence point of the zero-order diffraction light 111 and a point 107 on the dividing line 105 of the six-divided optical detector 102, while the third and fourth regions 30C and 30D of the grating lens 30 have grating patterns respectively corresponding to interference fringes which are formed with spherical waves radiating respectively from the convergence point of the zero-order diffraction light 111 and a point 108 of the optical detecting element 102B of the six-divided optical detector 102, and with spherical waves radiating respectively from the convergence point of the zero-order diffraction light 111 and a point 109 of the optical detecting element 102A of the six-divided optical detector 102.

Figure 12:
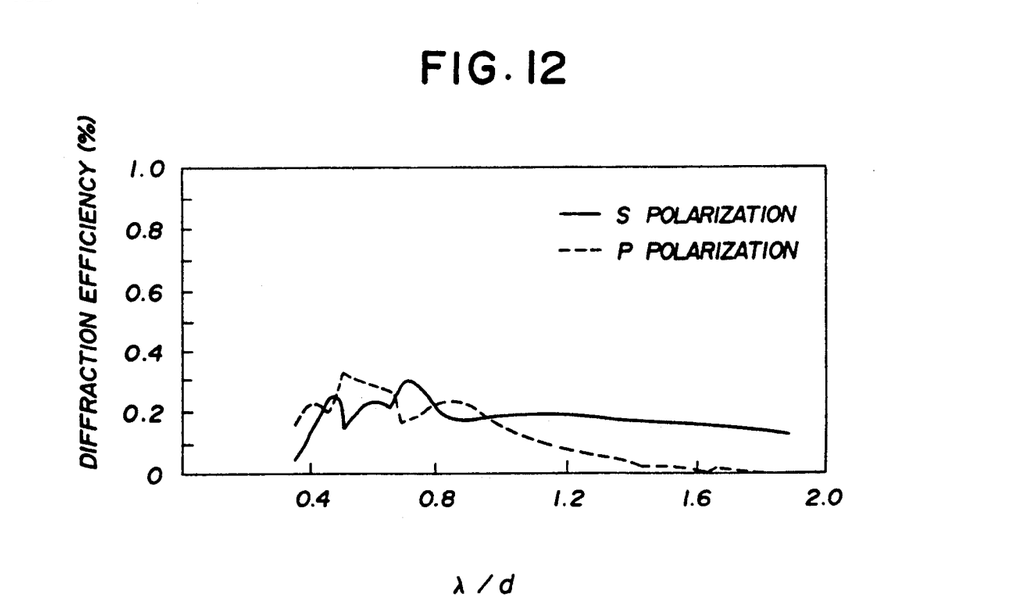
FIG. 12 is an explanatory diagram showing a diffraction efficiency in regard to λ/d in the fifth embodiment according to the invention.

FIG. 12 shows a diffraction efficiency which is dependent on the ratio $\lambda/d$ in a case where a grating of a sinusoidal cross section having the ratio $h/d$ of 0.5 is adopted. As clearly shown therein, a diffraction efficiency of p-polarized light is substantially zero if the ratio $\lambda/d$ is equal to or more than 1.5. Accordingly, the grating lens 30 is arranged such that a polarization of signals is to be p-polarized light on the surface of the grating lens 30 in the fifth embodiment. Therefore, a high S/N ratio is obtained because the p-polarized signals are received in the polarizing prism 71 and optical detector 103 by almost 100%.

In operation, the laser beam which is reflected from the optical disk 29 to be supplied to the grating lens 30 is diffracted to be diffraction light beams 110A, 110B, 110C, and 110D which are then received at the points 106, 107, 108, and 109 on the optical detecting elements 102A, 102B, 102C, 102D, 102E, and 102F. The zero-order diffraction light beam 111 is divided into two polarized light beams each having a polarized plane orthogonal to the other which are then received on the optical detecting elements 103A and 103B of the two-divided optical detector 103. A RF signal is obtained in the calculation of the subtraction between outputs of the optical detecting elements 103A and 103B. The detection of tracking and focus errors is understood in accordance with the explanations of the former embodiments so that repeated explanations are omitted here. Further, the optical head may be modified by use of the grating lens 30 or 60 in FIG. 3 or 6. As a matter of course, the optical disk 29 may be replaced by a magneto-optical disk.

Although the invention has been described with respect to specific embodiment for complete and clear disclosure, the appended claims are not to be limited but are to be construed as embodying all modifications and alternative constructions that may occur to one skilled in the art which fairly fall within the basic teaching herein set forth.

What is claimed is:

1. An optical head, comprising:
    a light source for radiating a light beam;
    propagating and reflecting means for propagating said light beam for focusing on a recording medium and for reflecting a light beam which is reflected from said recording medium in a predetermined direction;
    a grating lens having plural regions which are different in at least one of focal length and diffraction direction from the others, said grating lens receiving said light beam having been reflected by said propagating and reflecting means so that said light beam having been reflected by said propagating and reflecting means is diffracted to provide focused near-field diffraction light beams including a zero-order diffraction light beam and at least one first-order diffraction light beam, wherein said grating lens provides five diffracted light beams including said zero-order diffraction light beam; and
    an optical detector having plural light receiving surfaces, one of said plural light receiving surfaces being used exclusively for said zero-order diffraction light beam;
    wherein said diffracted light beams are detected by said plural light receiving surfaces corresponding to said diffracted light beams, said zero-order diffraction light beam and said at least one first-order diffraction light beam being focused on respective ones of said plural light receiving surfaces, wherein said propagating and reflecting means comprises:
- a ¼ wavelength plate for converting said light beam into a first circularly polarized light beam and for converting a second circularly polarized light beam, which is reflected from said recording medium and traveling in a direction opposite that of said first circularly polarized light beam, into a linearly polarized beam;
- an object lens for focusing said circularly polarized light beam supplied from said ¼ wavelength plate on said recording medium; and
- a polarized beam splitter for reflecting said linearly polarized beam in said predetermined direction.

2. An optical head according to claim 1, wherein said grating lens is composed of first and second regions divided by a line intersecting the light axis of said object lens and being parallel to a tracking error direction of said recording medium, and of third and fourth regions provided symmetrically on said line, said first and second regions being different in their focal lengths and diffraction direction from each other, and said third and fourth regions being different in their focal lengths and diffraction directions from said first and second regions, and said plural light receiving surfaces of said optical detector are positioned dependent upon the arrangement of said first to fourth regions of said grating lens.

3. An optical head according to claim 1, wherein said grating lens is composed of first and second regions divided by a line intersecting the light axis of said object lens and being parallel to a track of said recording medium, and of third and fourth regions provided symmetrically on both sides of said line, said first and second regions being different in their focal lengths and diffraction directions from each other, and said third and fourth regions being different in their focal lengths and diffraction directions from said first and second regions, and said plural light receiving surfaces of said optical detector are positioned dependent upon the arrangement of said first to fourth regions of said grating lens.

4. An optical head according to claim 1, wherein said grating lens is composed of first to fourth regions divided by two lines each being intersected in the center thereof and being not parallel and perpendicular to a track of said recording medium, said first and second regions being different in their focal lengths and diffraction directions from each other, and said third and fourth regions being different in their focal lengths and diffraction directions from said first and second regions, and said plural light receiving surfaces of said optical detector are positioned dependent upon the arrangement of said first to fourth regions of said grating lens.

* * * * *